W. E. ELLIOTT.
CONTROLLING MECHANISM FOR BUTTON ATTACHING MACHINES.
APPLICATION FILED MAY 9, 1913. RENEWED MAR. 8, 1915.
1,175,908.
Patented Mar. 14, 1916.
3 SHEETS—SHEET 1.
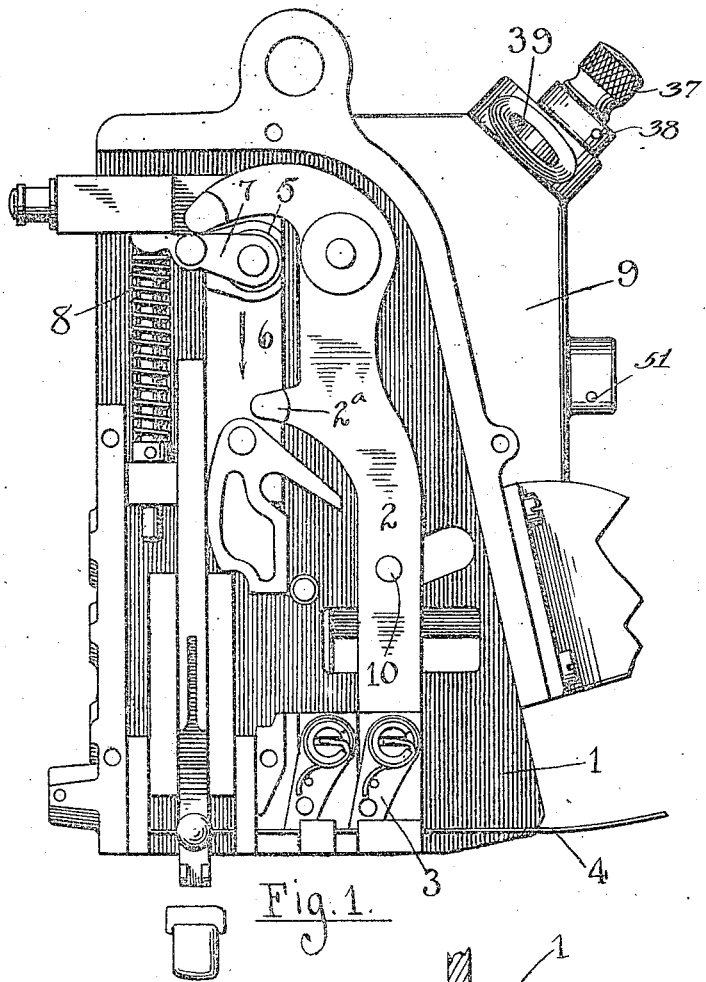
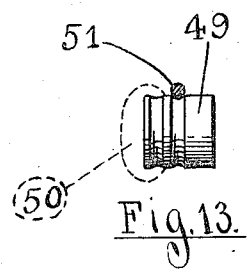
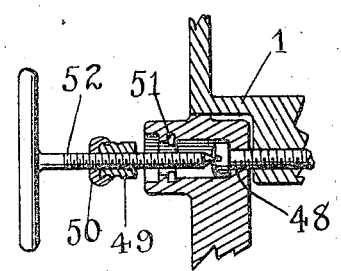
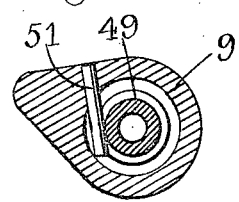
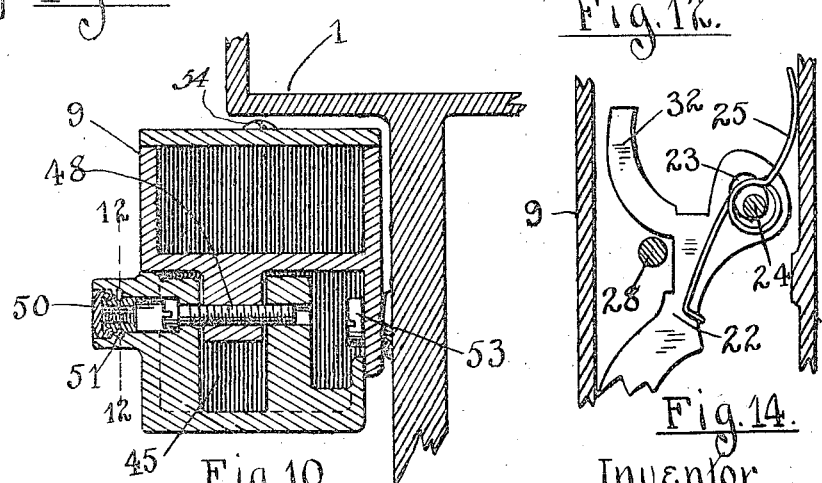

W. E. ELLIOTT.
CONTROLLING MECHANISM FOR BUTTON ATTACHING MACHINES.
APPLICATION FILED MAY 9, 1913. RENEWED MAR. 8, 1915.
1,175,908.
Patented Mar. 14, 1916.
3 SHEETS—SHEET 2.
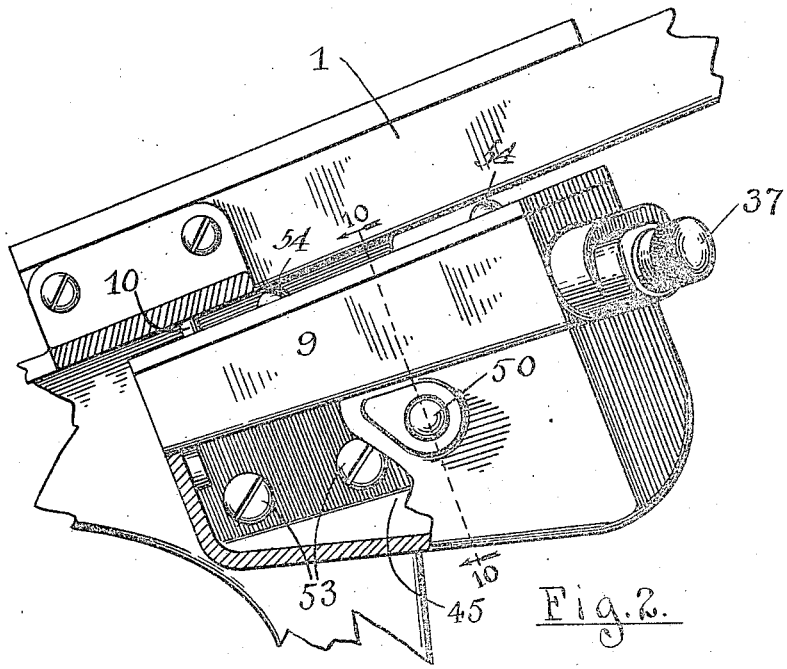
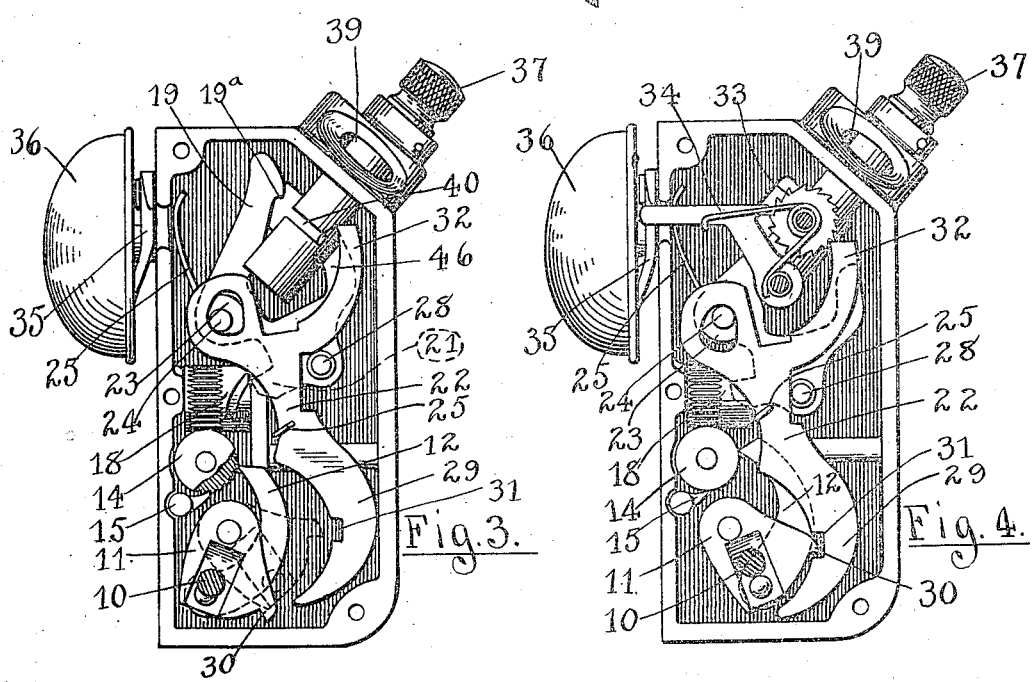
Witnesses
Harold O. Van Antwerp
Palmer A. Jones
Inventor
William E. Elliott
By Luther V. Moulton
Attorney

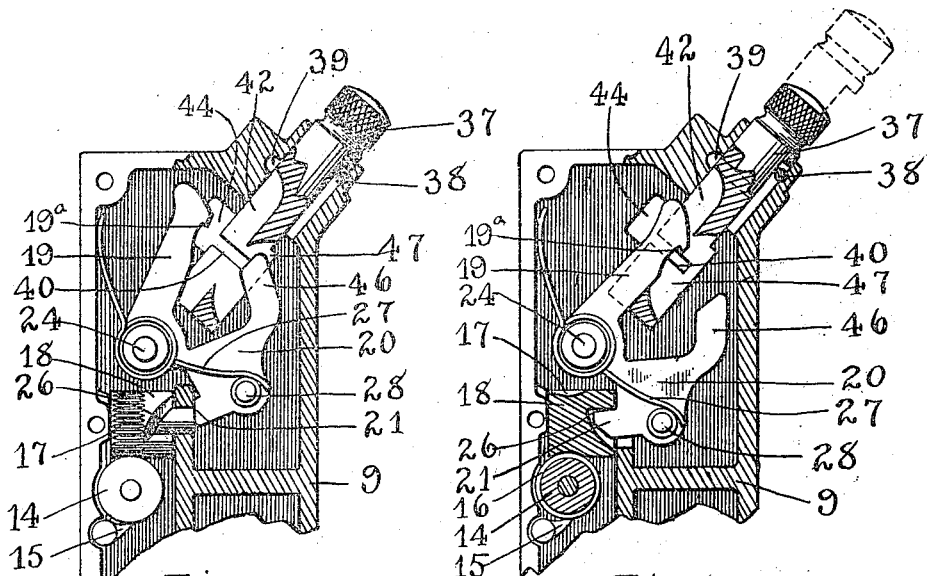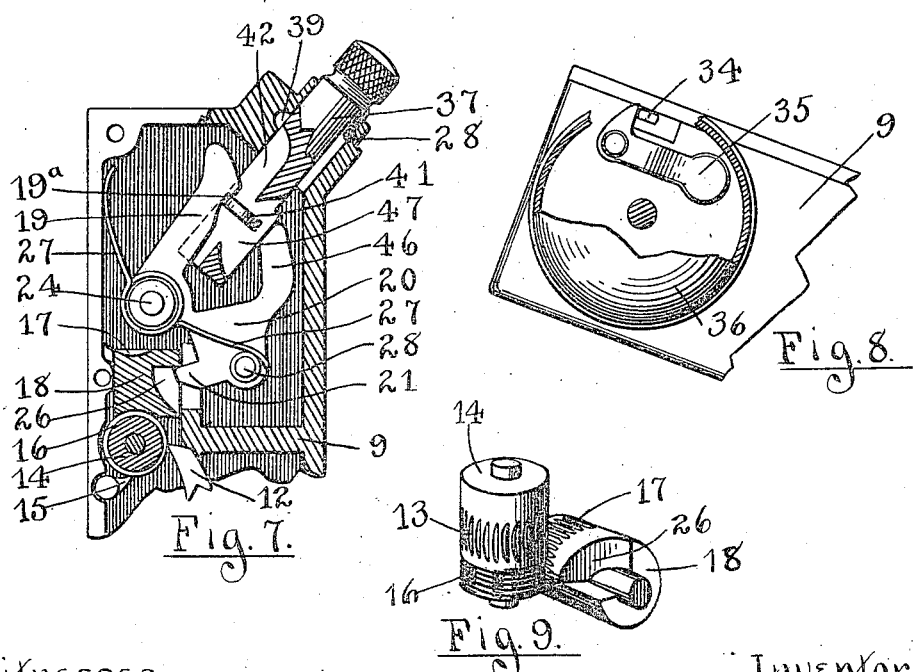

UNITED STATES PATENT OFFICE.

WILLIAM E. ELLIOTT, OF GRAND RAPIDS, MICHIGAN.

CONTROLLING MECHANISM FOR BUTTON-ATTACHING MACHINES.

1,175,908.  Specification of Letters Patent.  Patented Mar. 14, 1916.

Original application filed August 19, 1912, Serial No. 715,794. Divided and this application filed May 9, 1913, Serial No. 766,659. Renewed March 8, 1915. Serial No. 12,889.

*To all whom it may concern:*

Be it known that I, WILLIAM E. ELLIOTT, a citizen of the United States of America, residing at Grand Rapids, in the county of Kent and State of Michigan, have invented certain new and useful Improvements in Controlling Mechanisms for Button-Attaching Machines; and I do hereby declare the following to be a full, clear, and exact description of the invention, such as will enable others skilled in the art to which it appertains to make and use the same.

My invention relates to controlling mechanisms for various machines, and more particularly for shoe button-attaching machines such as shown and described in my copending application, Serial Number 715,794 filed August 19th, 1912, from which this application is divided by requirement of the Patent Office.

The object of my present invention is to provide a controlling mechanism which, when a predetermined number of button-attaching devices have been formed by the machine to which the device is applied, will automatically lock such machine from further operation; and, also which will by suitable devices, release such machine from its locked condition and retain a check to tally the operations of the machine, and to provide the device with various novel features of construction and arrangement as hereinafter more fully described and particularly pointed out in the claims.

A member which is moved in the operation of the button-attaching machine in utilized to operate my controlling mechanism. In the machine of the application referred to, such member is an oscillatory arm, each of the operative movements of which feeds wire into a device whereby it is formed into a button-attaching staple.

In the preferred embodiment of my invention herein illustrated, the controlling mechanism is operated by a stud projecting from a wire feeding arm, and comprises a locking mechanism, whereby, after the arm has made a certain predetermined number of oscillations, the said mechanism automatically locks the arm in operative position and prevents it from feeding more wire for forming staples.

When the locking mechanism is in operative position, a slidable plunger may be partially withdrawn and check or counter of a certain size and shape may be inserted through a slot in the case into a corresponding slot in the plunger, and by moving the plunger inward, together with the check, the locking mechanism is moved to release the wire feeding arm, so that it may resume operation. After the arm has again operated sufficiently, the check is released and falls into a sealed receptacle, being retained therein; the accumulated checks thus serving to tally the total times that the predetermined number of staples have been formed by the machine.

The device is also provided with various novel features of construction and arrangement, as will more fully appear by reference to the accompanying drawings illustrating a preferred embodiment of my invention.

In the drawings:—Figure 1 is a plan view of a portion of the staple forming parts of a button-attaching machine, showing my controlling mechanism applied thereto; Fig. 2 is a side elevation of the same with parts broken away; Fig. 3 is a plan view of the controlling mechanism illustrating the parts in their inoperative or releasing position; Fig. 4 is a like view of the same, illustrating the parts moved to operative or locking position; Fig. 5 is a sectional plan of one end of the device with the upper parts in releasing position; Fig. 6 is a like view of the same with parts moved to locking position; Fig. 7 is a like view of the same with parts moved to releasing position by the insertion of a check or counter; Fig. 8 is an elevation of the warning bell with parts broken away; Fig. 9 is a perspective view of the worm and cylinder operating the controlling mechanism; Fig. 10 is a transverse section on line 10—10 of Fig. 2, illustrating the means of attaching and sealing the check receptacle; Fig. 11 is a sectional detail, illustrating the method of breaking the seal of such receptacle; Fig. 12 is an enlarged section of certain parts on the line 12—12 of Fig. 10; Fig. 13 is an enlarged view of the sealing plug for the check receptacle; and Fig. 14 is an inverted sectional plan of a portion of the mechanism showing details of arrangement.

Like numbers refer to like parts in all of the figures.

1 represents the frame of the button attaching machine to which my controlling mechanism may be applied.

2 is the oscillatory wire feeding arm pivoted in the frame of the machine and provided at its lower end with a wire gripper 3 which seizes the wire 4 at each operative stroke and feeds it forward into a position to be cut off and formed into a button attaching staple. This arm is provided below the pivot point, with an extension 2ª, which is engaged by a roller 5 mounted on a slidable member 6 of the machine to force the arm backward on its return or inoperative stroke to get a fresh grip on the wire, and the upper end of the arm is turned at right angles to the main body thereof and is engaged on the return stroke of the slidable member 6, by a pivoted member 7 mounted upon said slidable member. The said pivoted member 7 is held in operative position by a coiled spring 8, and should the operative movement of the wire feeding arm be prevented, this pivoted member will yield and compress the spring 8, thus allowing the arm 2 to remain stationary.

The controlling mechanism is contained in a case 9 attached to the frame of the machine beneath the wire feeding arm 2 and a stud 10 on the said arm projects through a slot in the cover of the case 9 and enters a recess in an oscillating or swinging block 11 pivotally mounted in the case.

A pawl 12 on the block 11 engages ratchet teeth 13 on the worm shaft 14, and each oscillation of the block 11, caused by oscillation of the arm 2, rotates the worm shaft one tooth of this ratchet. A retaining pawl 15 also engages the ratchet teeth of the worm shaft and prevents return movement of the same.

The worm shaft is provided with a screw thread or worm 16, which engages gear teeth 17 in a rotative cylinder or drum 18. The number of ratchet teeth on the worm shaft and the pitch of the screw thread and worm teeth, are such that the desired number of oscillations of the wire feeding arm will rotate the drum 18 exactly one revolution.

An arm 19, pivoted as at 24 has an extension 20, a lug 21 on which extension engages the end of the cylinder or drum 18, being pressed toward the same by a spring 27. A floating plate 22 is provided with an opening 23, through which passes a fixed stud, such as the pivot 24, said opening 23 being large enough to allow a limited movement of said plate about the stud or pivot 24. A spring 25 normally holds this plate 22 in the position shown in Fig. 3, so that it will not be engaged by any moving part of the device. The end of the cylinder 18, which is engaged by the lug 21, is provided with a recess 26, and as this cylinder rotates, the recess will come opposite the lug, which lug will then be moved into the recess by means of the spring 27, the force of which overcomes the spring 25, thus changing the position of the arm 19 and the extension 20. A stud 28 projects from the said extension, and as the lug 21 moves into the recess, this stud will engage the plate 22 and change its position to that shown in Fig. 4, carrying its lower end 29 into the path of the pivoted block 11 which is provided with an extension 30, which extension will now enter a recess 31, provided in the lower end 29 of the plate 20, which operates as a detent to limit the movement of the pivoted block and feed arm 2, the said arm 2 being thus locked and held from operation. While in this locked condition the parts are not permitted a full movement, but owing to the size of the opening 23 in the plate 22, this plate may be caused to move to a limited extent should an attempt be made to operate the button-attaching machine. This movement of the plate is sufficient to cause a pawl or projection 32 thereof to engage a tooth of a ratchet wheel 33 and move the wheel. A pivoted arm 34 is provided with a projection which also engages the teeth of the ratchet wheel 33, and as this wheel is rotated, the arm is given a vibratory movement, and its movable end engages a bell hammer 35, causing it to strike and sound a bell 36, thus warning the operator that the wire feed arm of the button-attaching machine is locked.

To provide means for releasing the locking mechanism a slidable plunger 37 is provided, which extends through the case and is limited in its movement by a pin 38 within an elongated depression in the side of the plunger. When the parts are in locking position, this plunger may be drawn outward until a transverse slot 40 therein registers with an opening 39 in the case, and a counter or check 41, preferably a metallic disk as shown, may then be dropped through this opening into the slot. The inner end of the plunger is provided with a longitudinal slot 42 to receive the pivoted arm 19, and when the parts are in locking position, the said arm extends within this slot. By moving this plunger inward with the check carried in the transverse slot 40, this check is caused to engage the inclined end of the arm 19, and to cam or raise the said arm out of the slot 42. This movement nearly removes the lug 21 from the recess 26 in the end of the drum 18, and at the same time the stud 28 is moved to release the plate 22, which is returned to its normal position (shown in Fig. 3) by means of the spring 25, whereby the pivot block 11 is released and allowed to again oscillate. The arm 19, close to the inclined outer end, is provided with a hook 19ª, which catches upon the check 41 after it has been inserted in position, (as shown in Fig. 7), and prevents the plunger from being withdrawn from the case, the spring 27 holding the arm 19 and its hook 19ª in engagement with the check, and retains it in the plunger.

The inward movement of the plunger and the check raises the arm 19 partially out of the slot 42 in the plunger, and at the same time raises the lug 21 only partially from the recess 26 in the end of the drum 18. This movement is sufficient, however, to move the plate 22 and allow the button-attaching machine to be again operated; and as the drum 18 is rotated the inclined bottom of the recess 26 will engage the lug 21 and gradually force it outward. This will move the arm 19 still farther out of the slot 42 in the plunger, thus releasing the check 41, which will then fall through an opening 44, into a receptacle 45, which is attached to the underside of the case. As the lug 21 is raised entirely out of the recess 26, a detent 46 on the extension 20 enters a slot 47 in the plunger and prevents the withdrawal or outward movement of the same until the drum makes a complete revolution and the lug 21 again enters the recess 26.

The receptacle 45 which receives the checks is held in place by a screw 48, the head of this screw being deeply countersunk and the opening sealed by a plug 49. This plug is preferably cylindrical in shape; has a threaded axial opening and is provided with two annular grooves in its periphery. One of these grooves serves to retain a covering 50 of wax or like substance, which covers the threaded opening through the plug, and the other groove receives a pin 51 of soft metal to retain the plug in position.

When the countersunk opening for the screw is thus sealed it is necessary to break the seal in order to remove the screw 48. To facilitate this, a tool 52 is used, the same being a threaded rod provided with a handle so that it may be manually rotated. The end of the tool is thrust through the wax covering 50 of the plug, and screwed through the threaded opening therein until the end of the tool engages the screw head. This prevents further inward movement of the tool and further rotation of the same will force the plug out of the opening, breaking the soft metal pin 51.

The screws 53, by which the case 9 is attached to the frame 1 are covered by the receptacle 45 when it is in place, and the screws 54 which are used to attach the cover of the case are located beneath an overhanging ledge of the frame of the machine; it is therefore impossible to get at any of said screws without first detaching the receptacle 45, and to do this it is necessary to break the seal 49; in this way one seal serves as a protection for the screws to attach the whole device.

The operation of the device is as follows;—Assuming that the controlling mechanism is set in released condition and the wire feeding arm free to oscillate. With each oscillation of the said arm the pivoted block 11 is caused to oscillate. As the drum completes a revolution, the lug 21 drops into the recess 26 in the end of the drum and the stud 28 engages the edge of the plate 22 and moves the same so that the extension 30 enters the recess 31, thus locking the wire feeding arm 2 of the button-attaching machine and rendering it inoperative. Should any one now attempt to operate the machine the bell 36 will be sounded to warn the operator that the machine is locked and the wire feed inoperative. When the lug 21 enters the recess 26, the detent 46 is withdrawn from the slot 47 in the plunger, and at the same time the pivoted arm 19 enters the longitudinal slot 42 on the opposite side of the plunger. The plunger can then be drawn outward and the device again released as heretofore described, each check used being retained and serving to indicate the number of times the machine has been operated the predetermined number of times.

What I claim is:—

1. In combination with a movable member, a detent to hold the same from moving, an arm to move the detent to operative position, a spring to actuate the arm, a cylinder to control the arm, and means operated by the movable member to rotate the cylinder.

2. In combination with a movable member, a detent to hold the same from moving, an arm to move the detent to operative position, a spring to actuate the arm, a cylinder to control the arm, means operated by the movable member to rotate the cylinder and manually operated means adapted to receive a check for moving the arm to inoperative position, and temporarily holding the same in said position.

3. In combination with a movable member, a detent to hold the same from moving, a spring actuated arm to move the detent to operative position, manually operated means adapted to temporarily retain a check to engage and move the arm to inoperative position, a rotative cylinder to hold the arm in inoperative position, and means for connecting the cylinder with the movable member to rotate the cylinder.

4. In combination with a movable member, a detent to hold the same from moving, a spring actuated arm to move the detent to operative position, a manually operated plunger having a recess to receive a check adapted to engage the arm and move the same to inoperative position, a cylinder adapted to engage the arm and further move the arm to release the check, and also adapted to hold the arm in inoperative position, and finally to release the arm, and means for rotating the cylinder operated by the movable member.

5. In combination with a movable member, a detent to hold the same from moving, an arm to engage and move the detent to operative position, a spring to operate the arm, a manually operated plunger having a slot to receive a check adapted to engage the arm and move the same to inoperative position, a detent on the arm to hold the plunger when the arm is in inoperative position relative to the first named detent, a cylinder adapted to further move the arm to release the check and means for rotating the cylinder operated by the movable member.

6. In combination with a movable member, a detent to hold the same, a spring to move the detent to inoperative position, a pivoted arm to move the detent to operative position, a spring to operate the said arm, a manually operated plunger having a recess to receive a check adapted to engage the arm and move the same to inoperative position, a hook on the arm to engage the check and hold the plunger, a detent on the arm to engage the plunger and hold the same when the hook is released from the check, a cylinder adapted to engage the arm and further move the arm to release the check and to hold the arm in said moved position and to finally release the arm after a predetermined number of movements of the movable member.

7. In combination with a movable member, a detent to hold the same from moving, a rotative cylinder having a recess, a pivoted arm adapted to move the detent to operative position and having a lug to engage the cylinder and enter the recess, a spring to move the arm toward the cylinder, and means operated by the movable member for slowly rotating the cylinder.

8. In combination with a movable member, a detent to hold the same, a spring to normally hold the detent in inoperative position, a pivoted arm having a stud to engage the detent and move the same to operative position, a cylinder having a recess, a lug on the arm to enter the recess and permit the arm to move the detent to operative position, and means for slowly rotating the cylinder operated by the movable member.

9. In combination with an oscillating member, a detent to hold the same, a pivoted arm to move the detent to operative position, a spring to operate the arm, a lug on the arm, a rotative cylinder having a recess to receive the lug, a worm shaft to rotate the cylinder, ratchet teeth in the worm shaft, a pawl on the oscillating member to engage the ratchet teeth, and a holding pawl to also engage said teeth.

10. In combination with an oscillating member, a detent consisting of a floating plate adapted to engage and hold said member, a spring to move said plate to inoperative position, a pivoted arm to move the plate to operative position, a spring to operate said arm, a lug on said arm, a rotative cylinder having a recess in its end to receive the lug and permit the arm to move the detent to operative position, worm gearing on the cylinder, a worm shaft engaging the said gearing, ratchet teeth on said shaft, and a pawl on the oscillating member engaging said ratchet teeth.

11. In combination with a movable member, a detent to engage and hold the said member, said detent having a limited movement therewith and an alarm bell operated by movement of the detent.

12. In combination with an oscillating member, a detent arranged to engage and hold said member after a predetermined number of oscillations thereof, said detent also having a limited movement with said member, a ratchet wheel, an arm on the detent to engage and move the wheel, and an alarm operated by the ratchet wheel.

13. In combination with an oscillating member, a detent arranged to engage and hold the same when the said member has performed a predetermined number of oscillations, said detent also having a limited movement therewith, an arm on the detent, a ratchet wheel engaged by the arm, a pivoted lever having a projection engaging the ratchet wheel, a bell, and a bell hammer operated by the said lever.

14. In combination with an oscillating member, a detent arranged for holding the said member after the latter has performed a predetermined number of oscillations, an alarm bell, means for operating said bell operated by the detent when said detent is in operative position.

15. In combination with an oscillating member, a pawl on said member, a worm shaft having teeth engaged by the pawl, a cylinder having teeth engaged by the worm and a recess, a pivoted arm having a lug to engage the cylinder and enter the recess, a spring to operate the arm, a detent to hold the oscillating member moved to operative position by the arm when the lug is in the recess, and means for moving the detent to inoperative position.

16. In combination with an oscillating member, a pawl on the same, a worm shaft having ratchet teeth engaged by the pawl, a rotative cylinder having teeth engaged by the worm and also having a recess in its end, a pivoted arm having a lug to engage the end of the cylinder and to enter the recess, a spring to move the arm toward the cylinder, means operated by the arm to lock the oscillating member, and means for manually releasing the locking means.

17. In combination with an oscillating member, a rotative cylinder having a recess, means for rotating said cylinder once to a predetermined number of oscillations of said member, an arm having a lug engaging the cylinder and entering the recess, a detent to hold said member moved to operative position by the arm when the lug enters the recess, a spring to operate the arm, a manually operable plunger having a transverse slot adapted to move a check inserted in the slot against the arm to actuate the arm to release the detent.

18. In combination with an oscillating member, a detent to hold the same, a pivoted arm having an extension adapted to engage the detent and move the same to operative position, a spring to move the detent to inoperative position, a spring to operate the arm, and move the detent to operative position, a rotative cylinder to engage the arm and hold the same out of operative position during one revolution of the cylinder, a plunger having a longitudinal slot to receive the pivoted arm and a transverse slot to receive a check adapted to engage the arm and move the same to inoperative position.

19. In combination with a movable member, a detent to engage and hold the same, an arm to move the detent into operative position, a rotative cylinder to hold the arm in inoperative position during a revolution of the cylinder and to release the arm at a predetermined position of the cylinder, a manually movable plunger having a longitudinal slot to receive the arm and a transverse slot to receive a check or counter adapted to engage and move the arm, a hook on the arm to engage the check and hold the plunger, and a detent on the arm to engage and hold the plunger after the hook is disengaged from the check.

20. In a device of the class described, the combination of a detent, a pivoted arm adapted to move the detent into operative position, a rotative cylinder adapted to hold the arm out of operative position while making one revolution, and releasing the same at the end of such revolution, a longitudinally movable plunger having a transverse slot to receive a check or counter loose in said slot to engage and move the arm, a hook on the arm to engage the check, said cylinder also operating to disengage the hook from the check to permit the check to fall out of the plunger, and a detent on the arm to engage and hold the plunger when the hook is disengaged from the check.

21. In a device of the class described, a detent, a pivoted arm having a lateral extension adapted to move the detent into operative position, a longitudinally movable plunger having a transverse slot to receive a check or counter loosely inserted in the slot to engage and move the arm, a hook on the end of the arm to engage the check and hold the plunger, a detent on the lateral and hold the plunger, a detent on the lateral extension to also engage and hold the plunger, a rotative cylinder having a recess therein, a lug on the extension engaging the cylinder and adapted to enter the recess and means for rotating the cylinder engaged and held from movement by the first named detent when the lug enters the recess.

22. In a device of the class described, a detent, a pivoted arm having a lateral extension to move the detent to operative position, a spring to operate the arm, a longitudinally movable plunger having a transverse slot to receive a check or counter loosely inserted in said slot to engage and move the arm, a hook on the arm to engage the check and hold the plunger, a detent on the extension to engage the plunger and hold the same when the hook is disengaged from the check, a lug on the extension, a rotative cylinder having a recess to receive the lug, an inclined bottom in the recess to engage the lug, a movable member held by said detent and means for rotating the cylinder operated by said member.

23. In a device of the class described, a detent, a spring to move the detent out of operative position, an arm to move the detent to operative position, a spring to operate the arm, a rotative cylinder having a recess provided with an inclined bottom, a lug on the arm to engage the cylinder and the bottom of the recess, to move the arm oppositely to the spring, a plunger having a transverse slot to receive a check or counter loosely inserted in said slot to engage and move the arm, a hook on the arm to engage the check and hold the plunger, and a detent on the arm to engage and hold the plunger after the hook is disengaged from the check.

24. In a device of the class described, a detent, a pivoted arm to engage and move the detent to operative position, a spring to move the detent to inoperative position, a spring to move the arm and overcome the first named spring, a longitudinally movable plunger having a longitudinal slot to receive the arm and a transverse slot to receive a check, a detent carried by the arm to hold the plunger and moved out of operative position whenever the arm moves into position to shift the first named detent to operative position.

25. In a device of the class described, an oscillating member, a detent to hold the same, a spring to move the detent to inoperative position, a pivoted arm to engage and move the detent to operative position, a spring to operate the arm, a longitudinally movable plunger, having a longitudinal slot to receive the arm, and a transverse slot to receive a check or counter to engage the arm and move the same to release the detent, a second detent to hold the plunger moved by the arm to inoperative position when the arm moves to position to move the first named detent to operative position, and a rotary member adapted to move the arm to release the check and permit the same to fall out of the plunger and afterward permit the arm to move to position to engage the first named detent.

26. In a device of the class described, a detent to hold a movable member, a pivoted arm to move the detent to operative position, a manually operated longitudinally movable plunger having a transverse slot adapted to receive a check, a second detent carried by the arm to engage the check and hold the plunger from moving outward, a third detent carried by the arm to engage and hold the plunger, a rotary member operated by the movable member to engage the arm and move the same to alternately move the second and third detent to inoperative position, and also to permit the arm to move the first named detent to operative position when the said rotary member has made a complete revolution.

In testimony whereof I affix my signature in presence of two witnesses.

WILLIAM E. ELLIOTT.

Witnesses:
HAROLD O. VAN ANTWERP,
LUTHER V. MOULTON.